(12) United States Patent
Shioda et al.

(10) Patent No.: US 7,177,809 B2
(45) Date of Patent: Feb. 13, 2007

(54) CONTENTS PRESENTING SYSTEM AND METHOD

(75) Inventors: Takehiko Shioda, Tsurugashima (JP); Soichi Toyama, Tsurugashima (JP); Keiichi Yamauchi, Tsurugashima (JP); Hiroaki Shibasaki, Tokyo-to (JP); Hideki Amano, Tokyo-to (JP)

(73) Assignee: Pioneer Corporation, Tokyo (JP)

( * ) Notice: Subject to any disclaimer, the term of this patent is extended or adjusted under 35 U.S.C. 154(b) by 748 days.

(21) Appl. No.: 10/164,600

(22) Filed: Jun. 10, 2002

(65) Prior Publication Data
US 2002/0188455 A1 Dec. 12, 2002

(30) Foreign Application Priority Data
Jun. 11, 2001 (JP) ............................. 2001-175648

(51) Int. Cl.
*G10L 15/00* (2006.01)
(52) U.S. Cl. ...................................... 704/251; 704/270
(58) Field of Classification Search ................ 704/275, 704/205–207, 231, 251, 270, 200
See application file for complete search history.

(56) References Cited

U.S. PATENT DOCUMENTS

| | | | |
|---|---|---|---|
| 5,625,748 A * | 4/1997 | McDonough et al. ....... | 704/251 |
| 5,899,972 A * | 5/1999 | Miyazawa et al. .......... | 704/249 |
| 5,977,968 A * | 11/1999 | Le Blanc .................... | 715/706 |
| 6,081,774 A * | 6/2000 | de Hita et al. ................. | 704/9 |
| 6,104,989 A * | 8/2000 | Kanevsky et al. ............. | 704/9 |
| 6,262,730 B1 * | 7/2001 | Horvitz et al. ............... | 715/707 |
| 6,529,902 B1 * | 3/2003 | Kanevsky et al. ............. | 707/5 |
| 6,581,050 B1 * | 6/2003 | Horvitz et al. ................ | 706/45 |
| 6,721,744 B1 * | 4/2004 | Naimark et al. .............. | 707/10 |
| 6,728,679 B1 * | 4/2004 | Strubbe et al. .......... | 704/270.1 |
| 6,731,307 B1 * | 5/2004 | Strubbe et al. ............. | 715/727 |
| 6,964,023 B2 * | 11/2005 | Maes et al. ................. | 715/811 |

FOREIGN PATENT DOCUMENTS

| | | |
|---|---|---|
| EP | 1 076 329 A2 | 2/2001 |
| WO | WO 01/16936 A1 | 3/2001 |

OTHER PUBLICATIONS

Japanese Abstract No. 11126092, May 11, 1999.
Thomas S. Polzin and Alexander Waibel: "Emotion-Sensitive Human-Computer Interfaces", ISCA Tutorial Ann Research Workshop on Speech and Emotion, Sep. 5-7, 2000, pp. 201-206, XP007005778.

* cited by examiner

*Primary Examiner*—Angela Armstrong
(74) *Attorney, Agent, or Firm*—Sughrue Mion, PLLC

(57) ABSTRACT

A contents presenting system includes: an analyzing unit which collects and analyzes user's conversation to output an analysis result; a contents acquiring unit which acquires contents from a contents database based on the analysis result; and a contents presenting unit which presents the acquired contents to the user. Since the analysis result of user's conversation includes a factor representing the environment where the user is talking, by determining contents based on the analysis result, it is possible to provide the contents which is suited for the environment where the user is present.

12 Claims, 6 Drawing Sheets

Fig. 4

| | ATMOSPHERE 1 | ATMOSPHERE 2 | ATMOSPHERE 3 | ATMOSPHERE 4 |
|---|---|---|---|---|
| CONVERSATION CONDITION | SMALL VOLUME & LOW FREQUENCY | SMALL VOLUME & HIGH FREQUENCY | LARGE VOLUME & LOW FREQUENCY | LARGE VOLUME & HIGH FREQUENCY |
| CONSIDERATION OF ATMOSPHERE | • NO CONVERSATION, • NOT CHEERFUL | • SMOOTH CONVERSATION • DON'T WANT TO BE DISTURBED • CALM BUT CHEERFUL | • NOT SMOOTH CONVERSATION • QUARREL OR ARGUMENT | • SMOOTH CONVERSATION • NORMAL CONVERSATION CONDITION • CHEERFUL CONVERSATION |
| PROCESSES (PROVIDING CONTENT) (CONTROL OF ENVIRONMENT ETC.) | • CHEERING MUSIC PIECE • LIVE VIDEO • ENTERTAINING PERFORMANCE VIDEO • TALK PROGRAM ON AIR ETC | • CALM MUSIC (CLASSICAL, MOODY, ETC.) • KEEP UNPROCESSED (KEEP CURRENT CONDITION) • ELIMINATE EXTERNAL SOUNDS • TURN OFF SOUNDS OF NAVIGATION SYSTEM | • RELAXING MUSIC/VIDEO • CALMING MUSIC | • KEEP UNPROCESSED (KEEP CURRENT CONDITION) • EASY BGM ETC. |

CONTENTS PRESENTING SYSTEM AND METHOD

BACKGROUND OF THE INVENTION

1. Field of the Invention

The present invention relates to a technical field of contents reproducing apparatus including an on-vehicle AV (Audio/Video) system and the like.

2. Description of Related Art

Nowadays, owing to advances of on-vehicle AV systems, users can enjoy a variety of contents such as sound and video even in a vehicle. That is, in addition to reproducing music information from a CD (Compact Disc) or a MD (Mini Disc), the user can watch TV programs or watch movies using a DVD player by utilizing a liquid crystal display of about 5 to 10 inches.

In reproducing such contents as sound and video in a vehicle, it is general that a user (driver or other passengers) selects her/his favorite contents and reproduces the same.

However, merely reproducing contents that are selected by the user may lead a case such that favorable contents are not necessarily reproduced depending on the relationship between such a plurality of passengers in the vehicle, as well as depending on the situation and atmosphere at that time. For example, assuming that the users in the same car start a quarrel when heavy music such as hard rock is being reproduced, continuously reproducing that music will somewhat agitate the quarrel. To the contrary, in a situation that the users enjoy talking with each other with light music or the like being reproduced, it is preferred to control the contents reproduction so as to keep the current condition, rather than reproducing unnecessary contents.

SUMMARY OF THE INVENTION

The present invention has been made in consideration of the above points, and it is an object of the present invention to enable reproduction of preferable contents in accordance with a situation and atmosphere where the user is present.

According to one aspect of the present invention, there is provided a contents presenting system including: an analyzing unit which collects and analyzes user's conversation to output contents from a contents database based on the analysis result; and a contents presenting unit which presents the acquired contents to the user.

With the content presenting system configured as described above, a user's conversation collected in an environment such as car or home is analyzed and an analysis result is output. Then, based on the analysis result, contents are acquired for presentation to the user. Since the analysis result of the user's conversation contains factors representing the environment where the user is talking, by determining contents based on the analysis result, it becomes possible to provide the contents which are suited for the environment where the user is present.

In this context, the term "conversation" refers to word outputs made between humans, or between a human and an apparatus such as a robot structured using a computer for the purpose of having a conversation with a human, excluding those speak in accordance with an input instruction on the apparatus side such as a sound input command in a navigation system, for example.

The analyzing unit may analyze at least one of a sound volume and a frequency of the user's conversation to output the analysis result. By this, by analyzing the user's conversation in consideration of the sound volume and the frequency of the conversation, it is possible to concretely judge the environment where the user is present.

The analyzing unit may analyze at least one of the sound volume and the frequency of the user's conversation to judge an atmosphere of an environment where the user is talking, and outputs the atmosphere as the analysis result. Thus, by judging the atmosphere of the environment where the user is present, it becomes possible to determine contents to be provided to the user.

The analyzing unit may further analyze contents of the user's conversation to judge the atmosphere of the environment where the user is talking. By this, by analyzing the contents of the user's conversation, it is possible to judge the atmosphere of the environment where the user is talking more accurately.

Alternatively, the analyzing unit may analyze contents of the user's conversation to output the analysis result. As a result of this, it is possible to assume topics and interests of the user at that time, making it easier to determine contents suited for that situation.

Preferably, the analyzing unit may include: a word database which stores correspondences between words and genres corresponding to the words; an accumulating unit which acquires genres of words in the user's conversation by looking up the word database, and accumulates the words and the genres; and an analysis result outputting unit which outputs, as the analysis result, at least one of the word and the genre which are large in number of accumulation among the words and the genres accumulated by the accumulating unit.

By this, a word contained in a user's conversation is extracted and a genre corresponding to the word is determined. Thereafter, during proceeding of the user's conversation, words and genres are accumulated, and contents relating to a word and/or genre which are/is the largest in the number of accumulation is provided. Since the word or genre which frequently appears in a user's conversation directly represents a topic or interest of the user's conversation at that time, more optimum contents presentation is enabled by considering such word or genre.

The analysis result outputting unit may output, as the analysis result, a word and/or a genre which are/is the largest in number of accumulation among the words and the genres accumulated by the accumulating unit. Since the word which appeared most frequently in the user's conversation and the genre thereof often indicate the largest interest of the user, and contents related to such an interest can be provided.

The contents presenting system may further include an environment controlling unit which controls an external factor that influences on the environment where the user is talking. As a result of this, not only merely providing the user with various kinds of contents, but also controlling the environment where the user is present is enabled.

The environment controlling unit may reduce or eliminate external sounds getting into the environment where the user is talking. Accordingly, in the case where the user is present in a very good environment or atmosphere, for example, it is possible to keep such a good atmosphere.

The contents acquiring unit may acquire the contents from the contents database in the contents presenting system. Accordingly, it becomes possible to acquire a necessary content rapidly and readily for provision to the user.

The contents acquiring unit may acquire the contents by way of communication from the contents database in an external server. Accordingly, it becomes possible to acquire for provision to the user various kinds of contents such as contents published on the Internet or contents that have not been stored in the content providing system, for example.

It is to be noted that the content may include at least one of music information, video information, electronic text information and browsing information published at a Web site on the Internet.

According to another aspect of the present invention, there is provided a contents presenting method including the steps of: collecting and analyzing user's conversation to output an analysis result; acquiring contents from a contents database based on the analysis result; and presenting the acquired contents to the user.

With such contents providing method, a user's conversation collected in an environment such as car or home is analyzed and an analysis result is output. Then, based on the analysis result, contents is acquired for provision to the user. Since the analysis result of the user's conversation contains factors representing the environment where the user is talking, by determining contents based on the analysis result, it becomes possible to provide the contents which is suited for the environment where the user is present.

According to still another aspect of the present invention, there is provided a program storage device readable by a computer, tangibly embodying a program of instructions executable by the computer to control the computer to function as the above contents presenting system.

According to still another aspect of the present invention, there is provided a computer data signal embodied in a carrier wave and representing a series of instructions which cause a computer to function as the above contents presenting system.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 4 shows examples of analysis results of atmosphere of user's conversation and corresponding processes according to the first method of presenting content.

DETAILED DESCRIPTION OF THE PREFERRED EMBODIMENTS

The preferred embodiments of the present invention will now be described below with reference to the attached drawings. The embodiments as described below are examples wherein the present invention is applied to an on-vehicle electronic system.

[1] Configuration of On-vehicle Electronic System

First, an on-vehicle electronic system according to the first embodiment will be explained with reference to FIG. 1.

Figure 1:
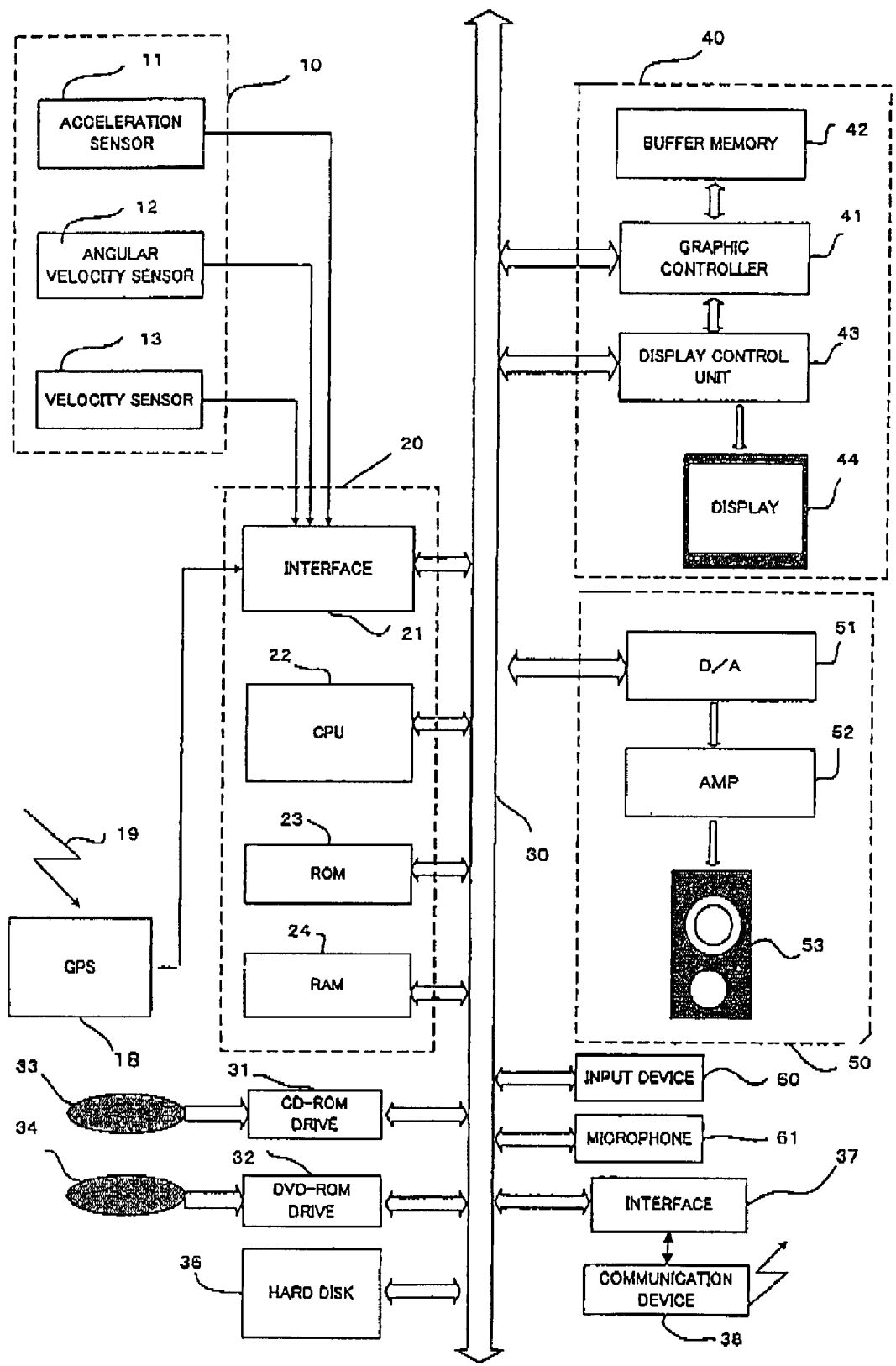
FIG. 1 is a block diagram showing a configuration of an on-vehicle electronic system according to the first embodiment of the present invention.

FIG. 1 is a block diagram showing the on-vehicle electronic system according to the first embodiment of the present invention.

As shown in FIG. 1, the on-vehicle electronic system according to the present embodiment includes a stand-alone navigation device 10, a GPS receiver 18, a system controller 20, a CD-ROM drive 31, a DVD-ROM drive 32, a hard disk unit 36, a communication interface 37, a communication device 38, a display unit 40, a sound output unit 50, an input device 60 and a microphone 61.

The stand-alone navigation device 10 includes an acceleration sensor 11, an angular velocity sensor 12 and a velocity sensor 13. The acceleration sensor 11 is formed of, for example, a piezoelectric device, and detects an acceleration of a vehicle and outputs acceleration data. The angular velocity sensor 12 is formed of, for example, a vibration gyroscope, and detects an angular velocity of a vehicle at the time of direction change of the vehicle, and outputs angular velocity data and relative bearing data.

The velocity sensor 13 is formed of a vehicle velocity sensor which detects rotation of an axle of a vehicle mechanically, magnetically or optically, and generates a vehicle velocity pulse which is a pulse signal, for every rotation for a predetermined angle of the axle.

The GPS receiver 18 receives an electric wave 19 carrying downstream line data including data for positioning, from a plurality of GPS satellites to be used for detecting an absolute position of the vehicle according to latitude and longitude information and the like.

The system controller 20 includes an interface 21, a CPU (Central Processing Unit) 22, a ROM (Read Only Memory) 23 and a RAM (Random Access Memory) 24, and is configured to control the entire on-vehicle electronic system.

The interface 21 carries out interface operation with the acceleration sensor 11, the angular velocity sensor 12 and the velocity sensor 13 so as to input, to the system controller 20, the acceleration data, the relative bearing data, the angular velocity data, the GPS positioning data, the absolute bearing data and the like in addition to a vehicle velocity pulse. The CPU 22 controls the entire system controller 20. The ROM 23 has a non-volatile memory or the like (not shown) in which control programs or the like for controlling the system controller 20 is stored. The RAM 24 stores various data such as route data entered in advance by a user via the input device 60, in a readable manner, and provides a working area for the CPU 22.

The system controller 20, the CD-ROM drive 31, the DVD-ROM drive 32, the hard disk unit 36, the communication interface 37, the display unit 40, the sound output unit 50, the input device 60 and the microphone 61 are connected with each other via a bus line 30.

The CD-ROM drive 31 and the DVD-ROM drive 32 read out, under the control of the system controller 20, various data such as road data including number of lanes and road width, as well as control programs corresponding to the respective embodiments as will be described later, from a CD 33 and a DVD 34, respectively, and output the same. It should be appreciated that the CD-ROM drive 31 and the DVD-ROM drive 32 may be provided solely, or a CD/DVD compatible drive may be provided.

The DVD-ROM drive 32 may have a function of reproducing a video DVD on which video data such as movies is recorded. Video data reproduced from a video DVD is displayed on the display unit 40, whereby the user can watch video contents such as a movie. In such a case, the user can selectively display map data for navigation and the video data from the video DVD on the display unit 40.

The hard disk unit 36 stores sound data or video data or data for navigation including map data and the like read from the CD-ROM drive 31 or the DVD-ROM 32. As a result of this, for example, it becomes possible to read out and output sound data or video data stored in the hard disk unit 36 while carrying out navigation operation by reading out map data recorded on the CD-ROM 33 or the DVD-ROM 34. Alternatively, it becomes possible to read out and output map data stored in the hard disk unit 36 while reading out and outputting sound data and video data recorded on the CD-ROM 33 and the DVD-ROM 34. Furthermore, it becomes possible to read out and output, at a desired point of time, sound data and video data or map data and the like which has been downloaded by means of the communication device 38 and stored in the hard disk unit 36.

The communication device 38 is implemented by, for example, a cellular phone, and is configured to be able to download, via the communication interface 37 forming a modem or the like, sound data and video data or map data and the like, or the whole or a part of predetermined kinds of database related to the same.

The display unit 40 displays various kinds of display data under the control of the system controller 20. The display unit 40 includes a graphic controller 41 for controlling the entire display unit 40 based on control data sent from the CPU 22 via the bus line 30; a buffer memory 42 formed of a memory such as VRAM (Video RAM) and for temporarily storing image information which is ready for display; a display control unit 43 for controlling a display 44 such as liquid crystal or CRT (Cathode Ray Tube) display based on image data output from the graphic controller 41; and the display 44. The display 44 is implemented by a liquid crystal display or the like having a diagonal length of about 5 to 10 inches, for example, and is mounted in the vicinity of a front panel in a car. The display unit 40 can display TV images received via a TV antenna (not shown) and video data of a video DVD reproduced using the DVD-ROM drive 32, as well as map data for navigation.

Furthermore, another video display unit having the similar configuration may be provided for exclusive use for reproduction of a video DVD With this configuration, passengers sitting on the back seats can enjoy movies and the like by reproducing movies of video DVD on another display provided near the back seats by means of the another video display unit while the driver drives with watching navigation data (map data) on the display 44 provided near the driver's seat. Furthermore, it is also possible to reproduce and display on the video display unit various other contents (for example, electronic books, electronic novels) from a DVD or other storage media. Furthermore, by connecting to the Internet via the communication device 38, it is possible to watch Web sites on the Internet by using the video display unit.

The sound output unit 50 includes a D/A converter 51 for performing D/A (Digital to Analogue) conversion of digital sound data sent from the CD-ROM drive 31 or the DVD-ROM 32, or from the RAM 24 or the like via the bus line 30 under the control of the system controller 20; an amplifier (AMP) 52 for amplifying an analog sound signal output from the D/A converter 51; and a speaker 53 for converting the amplified analog sound signal to sound and outputting the sound to the interior of the car.

In this manner, using the sound output unit 50, the display unit 40 and/or the video display unit provided separately from the display unit, it is possible to reproduce various contents in the car.

The input device 60 is configured by a key, a switch, a button, a remote-controller, a voice input device or the like. The input device 60 is disposed around the front panel of the main body of the on-vehicle electronic system mounted in the car or around the display 44.

The microphone 61 collects sounds of a user's conversation in the car and sends a voice signal to the system controller 20. The system controller 20 analyzes the voice signal and judges the atmosphere in the car where the users are talking, and judges the contents of the user's conversation. The details thereof will be described later.

As described above, in the on-vehicle electronic system according to the present embodiment, the navigation system is configured by the stand-alone navigation device 10, the GPS receiver 18, the system controller 20, the CD-ROM drive 31, the DVD-ROM drive 32, the hard disk unit 36, the communication interface 37, the communication device 38, the display unit 40, the sound output unit 50 and the input device 60 and the like. Also, the contents reproducing system is constructed by the system controller 20, the CD-ROM drive 31, the DVD-ROM drive 32, the hard disk unit 36, the communication interface 37, the communication device 38 the display unit 40, the sound output unit 50, the input device 60 and the like. That is, a plurality of constituents are shared by the navigation system and the contents reproducing system, which are centrally and by the same system controller 20.

It goes without saying that the on-vehicle electronic system may include various elements constituting an existing car audio system and a car TV system such as a radio antenna, a radio tuner, a TV antenna, a TV tuner, a cassette deck, a MD drive and the like, as well as the constituents illustrated in FIG. 1.

Data processing in the first embodiment and the later-described embodiments are mainly executed in the CPU 22 shown in FIG. 1. More specifically, a computer program for controlling the navigation system, a computer program for controlling the contents reproducing system and a computer program for controlling database are mainly executed in the CPU 22. And, an AGENT having various functions as will be described later is also logically constructed in the CPU 22 by computer programs. These computer programs may be stored in the ROM 23, the CD-ROM 31 or the DVD-ROM 32, or may be downloaded to the RAM 42, the hard disk unit 36 and the like via the communication device 38 such as a modem and a cellular phone.

[2] Contents Presentation

Figure 2:
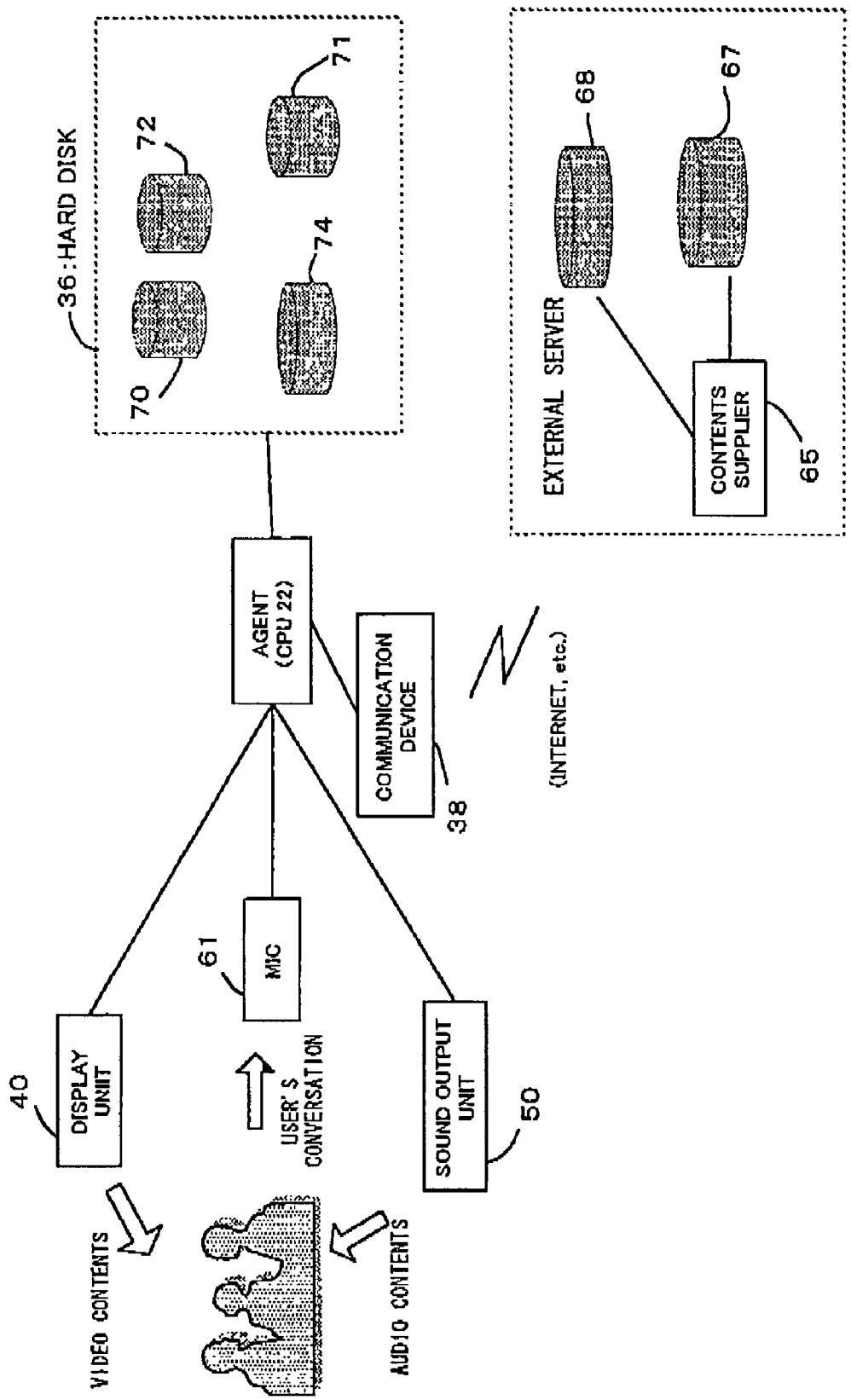
FIG. 2 is a diagram showing a concept of contents presentation according to the present invention.

Next, a concept of contents presentation of the present invention realized by the above-mentioned on-vehicle electronic system will be explained with reference to FIG. 2. FIG. 2 is a diagram showing a concept of contents presentation of the present invention, in a schematic manner. In FIG. 2, an AGENT is realized by the CPU 22 shown in FIG. 1 and necessary programs, and plays a principal role for presenting contents. As can be seen from the detailed configuration of FIG. 1, the AGENT is configured to communicate with the display unit 40, the sound output unit 50, the microphone 61, the communication device 38 and the hard disk 36. Furthermore, the AGENT can access an external server using the communication device 38 for downloading music, video and other various contents from contents DB 67 in the external server, or downloading music information from a music information DB 68.

In such a configuration, the AGENT collects sounds of user's conversation using the microphone 61 and analyzes the volume of voices in the conversation, the frequency of conversation, and the contents of the conversation, thereby determining which kind of contents are to be presented for the users who are present in such circumstances (or contents should not be presented). Upon determination of a certain content to be presented, the AGENT acquires the contents from the hard disk 36 to present, to the user, video contents via the display unit 40 or sound contents from the sound output unit 50. In the case where the contents to be presented are not stored in the hard disk 36, or in the case of a communicative on-vehicle electronic system designed to acquire contents from an external server by usually utilizing the communication device 38, the contents are downloaded from the external server via the Internet or the like to be supplied to the user via the display unit 40 and/or the sound output unit 50. In this way, the present invention is characterized by presenting a user with a favorable content based on a conversation of the user.

In FIG. 2, the hard disk 36 includes a music piece database (in this specification, "database" is abbreviated by "DB") 71, a word DB 70, a speech DB 72 and contents DB 74.

The music piece DB 71 stores plural pieces of sound information for playing back various music pieces, which is an example of content information, in the form being associated with attribute information such as play time, genre, performing artist and lyrics thereof. Alternatively, the music piece DB 71 stores the attribute information such as play time, genre, performing artist and lyrics in the form being separate from the plural pieces of sound information for playing various music pieces, but in the form being associated with the titles of the respective music pieces, for example. Data of such a music piece DB 71 is available from an external server or the like via the Internet or the like, and can be downloaded from the music information DB 68 in the external server shown in FIG. 2, for example. It is to be noted that in place of or in addition to constructing such a music piece DB 71 in the hard disk unit 36, the system controller 20 may access, via the communication device 38, the music information DB 68 constructed in an external server located at a distal place every time music piece data is required.

The word DB 70 is a kind of table storing the correspondence between words contained in user's conversations, and genres related to the words. In this context, "genre" means a concept that is related to a word for grasping the situation and atmosphere inside the car from the user's conversation, and classifies the word in various views. For example, the word "baseball" is related to the genre "sports", and the word "sea" is related to the genres "leisure", "travel", "sports", "fishing", "cruising" and the like. The AGENT can determine contents to be presented by extracting words contained in the user's conversation and considering the genres thereof.

The speech DB 72 serves as a buffer memory for temporarily storing words and genres contained in the user's conversation that are detected by the AGENT. The content DB 74 stores music, movies and other various kinds of contents.

The external server includes contents supplier 65, the contents DB 67 and the music information DB 68. The contents DB 67 stores music, movies and other various kinds of contents, and stores enormous amounts of contents in comparison with the content DB 74 constructed in the hard disk 36. The content supplier 65, in response to a request for contents from the AGENT via the Internet or the like, acquires the content from the content DB 67 and supplies them to the AGENT. The music information DB 68 stores information to be stored in the music piece DB 71 in the hard disk 36 as described above namely, the plural pieces of sound information for playing various music pieces, in association with the respective attribute information such as playtime, genre, performing artist, lyrics.

[3] Contents Presentation Method

In the following, examples of contents presentation method utilizing user's conversation according to the present invention will be explained.

(1st Method)

Figure 3:
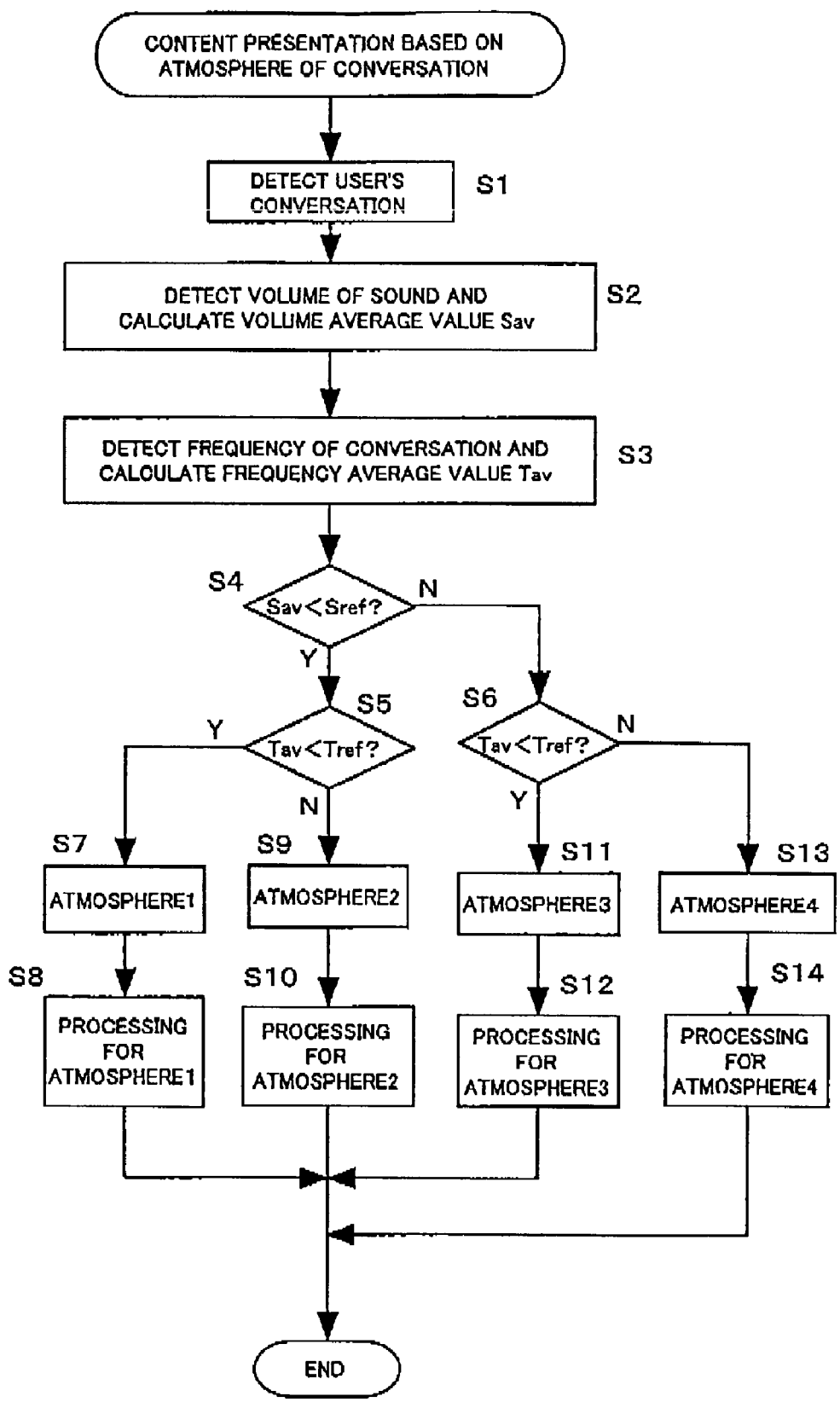
FIG. 3 is a flow chart showing a first method of presenting contents according to the present invention.

A first contents presentation method according to the present invention will be explained with reference to FIGS. 2 to 4. The first contents presentation method is to present contents to the user on the basis of an atmosphere of user's conversation. FIG. 3 is a flowchart thereof. It is to be noted that the following process is carried out by the AGENT (CPU 22) which executes a predetermined program.

In FIG. 3, first the AGENT detects a user's conversation by means of the microphone 61 (step S1). The user's conversation is output as a voice signal and sent to the AGENT.

The AGENT detects the sound volume of the conversation by analyzing the voice signal of the user's conversation, and calculates an average value Sav of the sound volume in a predetermined time (step S2). In this context, the "predetermined time" may be, for example, a time corresponding to one speech made by the user. Accordingly, it is possible to know the level of the sound volume at which the user is talking. It is also possible that the average values Sav thus obtained are further averaged, and an average value of the sound volumes of voices in plural times of speeches by the user is calculated.

Next, the AGENT detects the frequency of conversation by analyzing the voice signal of the user's conversation, and calculates an average value Tav of the frequency in a predetermined time (step S3). This averaging can be achieved by detecting how many speeches are made by the user in, for example, several minutes, and averaging the number of speeches thus detected for a unit of several minutes or several tens of minutes.

It is to be noted that the predetermined time for averaging the sound volume and the frequency of conversation can be determined in a somewhat empirical manner with reference to normal human conversations.

Next, the AGENT determines whether or not the average sound volume value Sav obtained in step S2 is smaller than a reference sound volume value Sref (step S4), and then determines whether or not the average conversation frequency value Tav obtained in step S3 is smaller than a reference frequency value Tref (steps S5, S6). Through these steps, it is possible to classify the situation of user's conversation into four atmospheres on the basis of the sound volume and the frequency of conversation. That is, when the volume of conversation is small and the frequency of conversation is low, it is determined as Atmosphere 1; when the volume of conversation is small but the frequency of conversation is high, it is determined as Atmosphere 2; when the volume of conversation is large but the frequency of conversation is low, it is determined as Atmosphere 3; and when the volume of conversation is large and the frequency of conversation is high, it is determined as Atmosphere 4 (Steps S7, S9, S11 and S13).

Then, by executing predetermined processes respectively corresponding to Atmospheres 1 to 4, the AGENT presents contents or the like (S9, S10, S12 and S14). FIG. 4 shows examples of consideration results for atmosphere and processes to be executed for Atmospheres 1 to 4. The examples of consideration results and processes for the respective atmospheres shown in FIG. 4 are stored in the hard disk 36 in the form of a table. The AGENT looks up this table based on the results of analysis for the sound volume and frequency of conversation (steps S4 to S6) and executes the process corresponding to these results.

As for Atmosphere 1, since the sound volume of conversation is small and the frequency of conversation is low, such a situation can be expected that there is no conversation or that the conversation, if the user have, is not so cheerful. Therefore, the AGENT performs as a corresponding process, for example, a process of reproducing a cheerful music piece, reproducing video pictures of music live, reproducing video pictures of entertainments, or reproducing a talk program on air, to thereby trigger a conversation (step S8).

As for Atmosphere 2, since the frequency of conversation is high regardless of the small sound volume of conversation, such a situation can be expected that the conversation is going well and hence the user does not want to be disturbed, or that the conversation is cheerful though the atmosphere is calm. Therefore, the AGENT performs as a corresponding process, for example, a process of reproducing soft music, or keeping the current situation without performing anything (for example, when certain music is reproduced, the music is continued) (step S10).

As for Atmosphere 3, since the sound volume of conversation is large but the frequency of conversation is not high, such a situation can be expected that the conversation is not smooth, or that the passengers have quarrel or argument. Therefore, the AGENT performs, as a corresponding process, for example, a process for reproducing music/picture which makes the user relaxed, or reproducing such music that suppresses the excitement (step S12).

As for Atmosphere 4, since the sound volume of conversation is large and the frequency of conversation is high, such a situation can be expected that the conversation is going smoothly and cheerful under a normal condition, or that the conversation is normal. Therefore, the AGENT performs, as a corresponding process, for example, a process of keeping the current condition without performing anything or reproducing easy BGM (Step S14).

Furthermore, in addition to controlling reproduction of content depending on the atmosphere, as described above, when the user's atmosphere is good, it is also possible to control the interior space of the car so as to actively stop or remove external disturbances or external factors toward the user from the external other than the contents reproduction, for the purpose of keeping such a good atmosphere. For example, in the case of Atmosphere 2 shown in FIG. 4, since it is assumed that the atmosphere in the car is very good, a control of turning down or turning off the volume of the voice messages and beeps of the car navigation system, for example, can be executed for keeping the current condition while eliminating the external sounds and the like. As a result of this, by not only controlling contents reproduction, but also by controlling other causes which will influence on the environment and the atmosphere inside the car, it is possible to make the environment and the atmosphere inside the car more favorable.

In this manner, since the AGENT analyzes the situation and the atmosphere of conversation in view of the sound volume and the frequency of user's conversation, and controls the contents reproduction based on the analysis, a suitable contents presentation is automatically achieved depending on the environment and the atmosphere inside the car where the users are present.

It is to be understood that the analysis of environment based on the volume and the frequency of conversation and the corresponding process as shown in FIG. 4 are cited merely by way of example, and it goes without saying that the analysis may be performed in other ways, or different processing methods can be employed. Furthermore, in the example of FIG. 3, though one reference value is provided for the volume and the frequency of conversation, by providing a plurality of reference values and classifying the sound volume and the frequency into more 3 or more levels, the atmosphere can be analyzed more finely.

(2nd Method)

Figure 5:
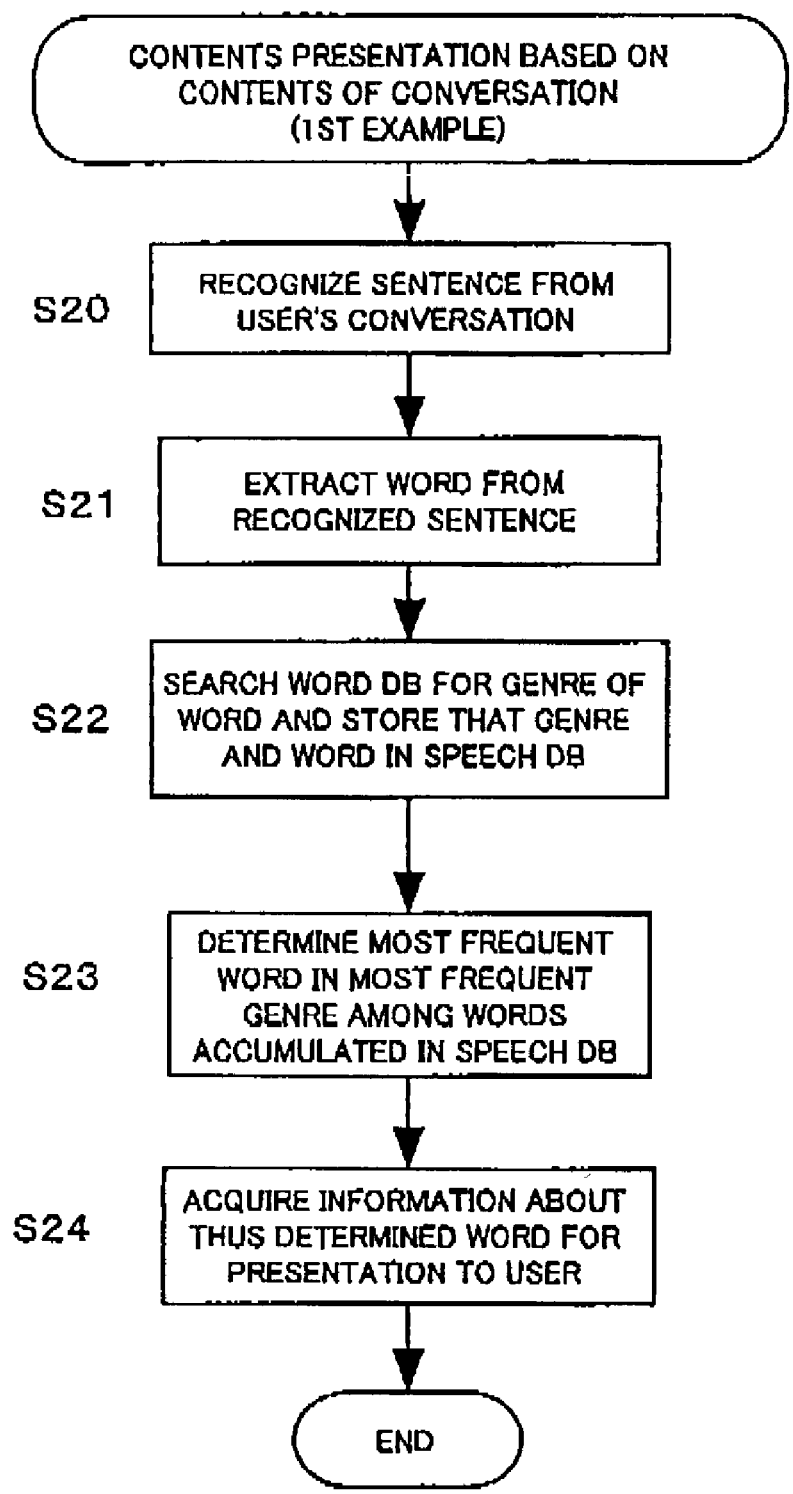
FIG. 5 is a flow chart showing a second method of presenting contents according to the present invention.

Next, the second contents presentation method will be explained with reference to FIG. 2 and FIG. 5. This method is to present contents in accordance with the contents of user's conversation. FIG. 5 shows a flowchart of this method.

First, the AGENT collects sounds of a user's conversation using the microphone 61 and analyzes a voice signal from the microphone 61 for recognition of sentences included in the user's conversation (step S20). This process can be realized in a variety of known approaches such as splitting a voice signal for comparison with a voice pattern prepared in advance, thereby recognizing sentences and words.

Next, the AGENT extracts words from the recognized sentence (step S21). Then, the AGENT searches for genres that are related to the words by looking up the word DB 70 in the hard disk 36, and stores both the words and the genres in the speech DB 72 (step S22). By executing this process for a predetermined period of conversation (or for a predetermined number of speeches included in the user's conversation), the words included in the conversation and their genres are accumulated in the speech DB 72.

Then, at the time when the words and the genres for the predetermined period of conversation or for the predetermined number of speeches have accumulated, the AGENT determines a word and a genre which are the largest in number among the words and the genres accumulated in the speech DB 72 (step S23). The genre which is the largest in number indicates that the user's conversation is related to that genre, and the word which is largest in number indicates that the conversation concentrates especially on that specific word in that genre.

Accordingly, the AGENT acquires from the content DB 74 in the hard disk 36 the contents corresponding to the word obtained in step S23 and presents it to the user (step S24). The content DB 74 in the hard disk 36 includes a table representing the correspondence between the contents and the words related to those contents. Thus, the AGENT finds the contents related to the words obtained in step S23 by looking up the table.

As described above, according to the second method, for example, under the circumstance that the user and the passenger(s) talk about a movie or a drama that the user and the passenger(s) watched together, and hence the words such as "movie" and "drama", the title of that movie or drama, the name of a leading actor (actress) and the like appear in the conversation, the AGENT can present the contents in a manner of, for example, playing back a music piece employed in that movie or drama or playing back a video introducing other movies in which the actor (actress) acts.

Though in the present example, the contents related to the most frequently appeared word in the most frequently appeared genre in steps S23 and S24 is presented to the user, it is also possible to determine the contents to be presented in various manners based on the genre and/or word which is the largest in number of accumulation, for example, by sequentially reproducing the contents starting from the contents related to the most frequently appeared genre, or by sequentially reproducing the contents starting from the contents related to the most frequently appeared word. Clearly, the contents which are closely related to the topic and interest of the user's conversation are presented by determining the contents based on the genre or word of the largest in number of accumulation, no matter which method is employed.

(Third Method)

Figure 6:
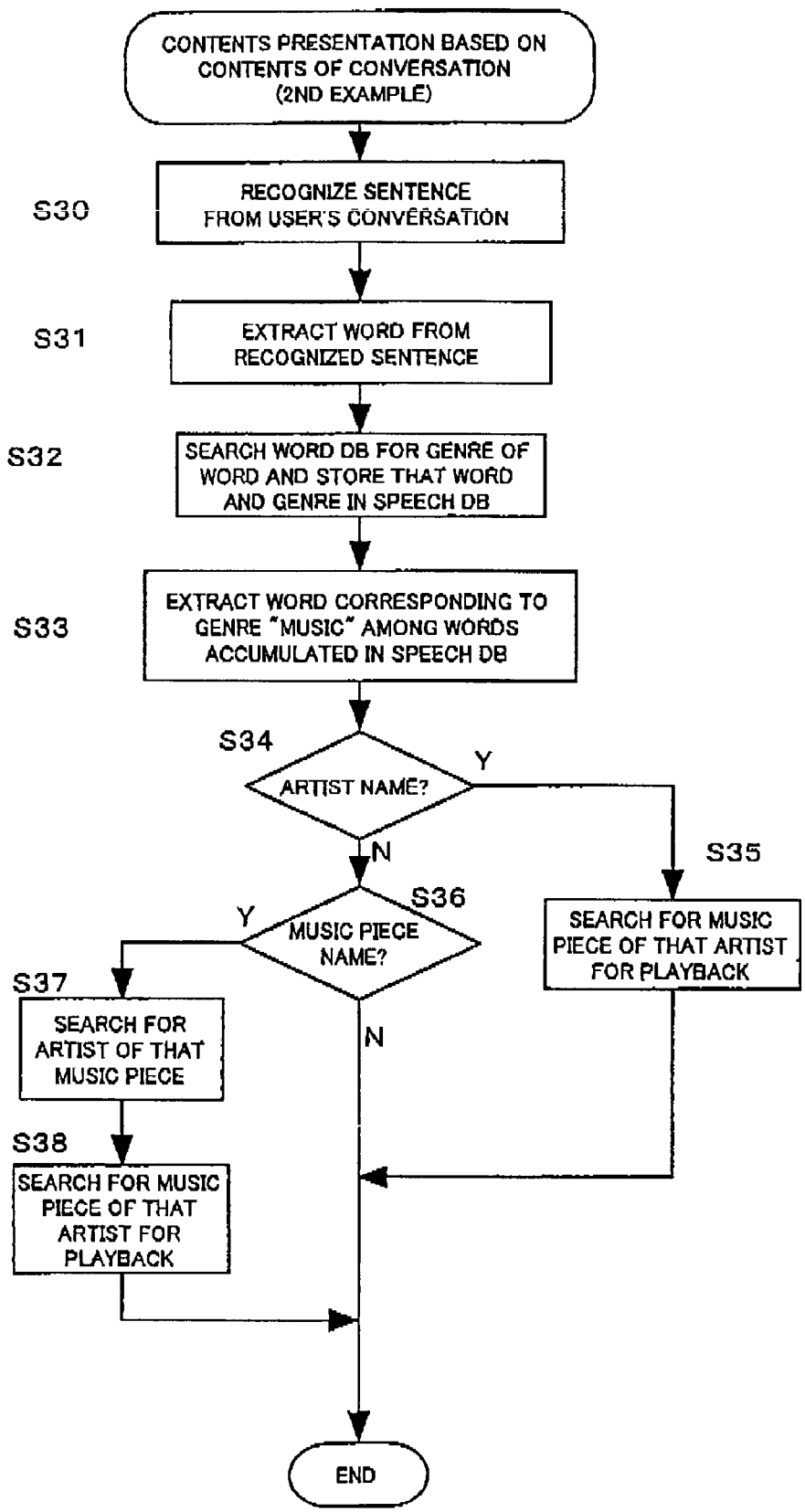
FIG. 6 is a flow chart showing a third method of presenting contents according to the present invention.

Next, the third contents presentation method will be explained with reference to FIG. 2 and FIG. 6. The third contents presentation method shows, as one example of the second contents presentation method, an example of presenting a music piece as the contents depending on the user's conversation. FIG. 6 shows a flowchart of this method.

First, similarly to steps S20 to S22 shown in FIG. 5, the AGENT recognizes sentences from a user's conversation (step S30), extracts words from the recognized sentences (step S31), and searches for the genre by looking up the word DB 70 and stores the word and the genre in the speech DB 72 (step S32).

Next, the AGENT extracts words corresponding to the genre "music" from the words stored in the speech DB 72 (step S33). In the present example, the words related to the genre "music" are a variety of words relating to music such as artist name, music piece name and album name.

Next, the AGENT judges whether the extracted word is "artist name" or not (step S34). If the word is "artist name", the AGENT fetches a music piece of that artist from the content DB 74 and reproduces the same (step S35).

On the other hand, if the word extracted in step S33 is not an artist name, the AGENT judges whether the word is "music piece name" or not (step S36). If it is not a music name, the process ends.

If the word extracted in step S33 is judged as a music piece name, the AGENT searches for the artist of that music piece by looking up the content DB 74 or the external music information DB 68 (step S37), and then acquires a music piece of the artist thus found by looking up the content DB 74 and plays back the same (step S38).

In this manner, when a word relating to music, e.g. artist name or music piece name is mentioned in the user's conversation, a music piece related to the word is searched out for playback. Therefore, a music piece performed by a band or group which is talked about in the user's conversation is automatically played back.

In the above description, the explanation has been made for the case where "artist name" and "music piece name" are utilized as the words relating to music, however, it is also possible to present the contents with the use of a variety of other words relating to music such as "album name" and "music genre (rock, jazz, etc.)".

Also, not only for music, but also for other genres such as movie and drama, it is possible to determine the contents using a word such as "leading actor (actress)", "performer" and "content genre (horror, love story, etc.)" and present the same to the user in the similar manner as described above.

[3] Modification/Application

In the above-described first contents presentation method, the atmosphere is judged based on the volume and the frequency of user's conversation. However, such a configuration is also available that the atmosphere is judged in consideration of the contents of the user's conversation obtained in the second and the third methods, in addition to the volume and the frequency of conversation.

For example, taking notice of words in the conversation, when specific words such as "You are to blame" or "You'll be sorry" appears in the conversation, which can be determined as an atmosphere where the user and passenger(s) are arguing, it is possible to present contents likely to control the excitement. Furthermore, in the case where it is determined as Atmosphere 4 based on the volume and the frequency of user's conversation in the first method, it is also possible to further judge the atmosphere using the contents of user's conversation obtained in the second and the third methods. In the case of the above-mentioned Atmosphere 4, for example, since the conversation is expected to be made under the normal condition, it would be often difficult to determine which kind of content is preferably provided. In such a case, by taking the contents of the user's conversation into account, it is possible to present more appropriate contents. By judging the atmosphere in consideration of the contents of the user's conversation, as described above, the accuracy in judging the atmosphere would be improved.

In the above description, the explanation has been made for the example wherein the AGENT principally presents the contents using a database configured in the hard disk, however, it is also possible to realize the above-described processes while communicating with a server such as the Internet by utilizing the communication device in the on-vehicle electronic system. In such a case, the AGENT which is virtually configured in the on-vehicle electronic system in the above description may be configured on the server to make it function as a server having contents presenting function. In such a case, analysis results of user's conversation (for example, Atmospheres 1 to 4 obtained in the first example, and genres and words obtained in the second and the third examples) are transmitted to the server via the communication device 38, and the server transmits an ID number for identifying contents and an entity of content data to the on-vehicle electronic system for presentation to the user.

Also, the present invention is applicable to a navigation system for walker utilizing a portable information terminal and a cellular phone insofar as it has contents reproducing function.

Furthermore, the present invention may be applied to home AV systems, household contents reproducing systems and-household electronics. In the case of a home AV system or a household contents reproducing system, a microphone is connected to a home AV system or a personal computer for detecting and analyzing a user's conversation, whereby suitable music, video or the like can be provided.

Further, as for a contents reproducing system including a personal computer as a main component, in the same manner as described above, it is possible to detect and analyze a user's conversation from a microphone, and acquire the corresponding contents via the Internet or the like based on the analysis. For example, when the conversation concentrates at the topic of football, since genres or words relating to football are extracted in accordance with the above-described second method, it is possible to search Web sites on the Internet using such genres or words as keywords and thereby acquiring related information for presentation to the user.

Furthermore, in the case of the application to the household electronics, it is possible to control electronic equipment and the like in a home by detecting and analyzing a user's conversation from the microphone and supplying the result of analysis to a controller for controlling the household electronic equipment. For example, in the case of Atmosphere 2 of the first example (the situation where the conversation is calm but cheerful) or the like, it is also possible to carry out various controls such as the controller controlling a telephone set to automatically enter phone-answering mode, or turning down the volume of doorbell (interphone) at the time of visitor arrival.

It is to be understood that the present invention is not limited to the foregoing embodiments, and various changes are possible without departing from the scope and the spirit of the present invention readable from claims and the entire description, such changed forms being embraced in the technical range of the present invention.

As described above, according to the present invention, since the environment, atmosphere or the like where the user is present is analyzed by analyzing a user's conversation, and contents presentation is controlled in accordance with the analysis, it is possible to present suitable contents in accordance with the user's environment, atmosphere or the like.

The entire disclosure of Japanese Patent Applications No. 2001-175648 filed on Jun. 11, 2001 including the specification, claims, drawings and summary is incorporated herein by reference in its entirety.

What is claimed is:

1. A contents presenting system comprising:
an analyzing unit which collects user's conversation, analyzes a sound volume and a frequency of the user's conversation to judge an atmosphere of an environment where the user is talking, and outputs the atmosphere as an analysis result;
a contents acquiring unit which acquires contents from a contents database based on the analysis result; and
a contents presenting unit which presents the acquired contents to the user, wherein the analyzing unit judges that the atmosphere is a first atmosphere when the sound volume is not smaller than a reference sound volume value and the frequency is not smaller than a reference frequency value and judges that the atmosphere is a second atmosphere when the sound volume is smaller than the reference sound volume value and the frequency is smaller than the reference frequency value, and
when the judged atmosphere is the first atmosphere, the contents acquiring unit acquires no content for presentation or acquires content which is representative of the first atmosphere.

2. The contents presenting system according to claim 1, wherein the analyzing unit further analyzes contents of the use's conversation to judge the atmosphere of the environment where the user is talking.

3. The contents presenting system according to claim 1, wherein the analyzing unit analyzes contents of the user's conversation to output the analysis result.

4. The contents presenting system according to claim 3, wherein the analyzing unit comprises:
a word database which stores correspondences between words and genres corresponding to the words;
an accumulating unit which acquires genres of words in the user's conversation by looking up the word database, and accumulates the words and the genres; and
an analysis result outputting unit which outputs, as the analysis result, at least one of the word and the genre which are large in number of accumulation among the words and the genres accumulated by the accumulating unit.

5. The contents presenting system according to claim 4, wherein the analysis result outputting unit outputs, as the analysis result, a word and/or a genre which are/is the largest in number of accumulation among the words and the genres accumulated by the accumulating unit.

6. The contents presenting system according to claim 1, further comprising an environment controlling unit which controls an external factor that influences on the environment where the user is talking.

7. The contents presenting system according to claim 6, wherein the environment controlling unit reduces or eliminates external sounds getting into the environment where the user is talking.

8. The contents presenting system according to claim 1, wherein the contents acquiring unit acquires the contents from the contents database in the contents presenting system.

9. The contents presenting system according to claim 1, wherein the contents acquiring unit acquires the contents by way of communication from the contents database in an external server.

10. The contents presenting system according to claim 1, wherein the contents includes at least one of music information, video information, electronic text information and browsing information published at a Web site on the Internet.

11. A contents presenting method comprising the steps of:
collecting user's conversation to output an analysis result, analyzing a sound volume and a frequency of the user's conversation to judge an atmosphere of an environment where the user is talking, and outputting the atmosphere as an analysis result;
acquiring contents from a contents database based on the analysis result; and
presenting the acquired contents to the user, wherein the analyzing step judges that the atmosphere is a first atmosphere when the sound volume is not smaller than a reference sound volume value and the frequency is not smaller than a reference frequency value and judges that the atmosphere is a second atmosphere when the sound volume is smaller than the reference sound volume value and the frequency is smaller than the reference frequency value, and
when the judged atmosphere is the first atmosphere, the acquiring step acquires no content for presentation or acquires content which is representative of the first atmosphere.

12. A program storage device readable by a computer, tangibly embodying a program of instructions executable by the computer to control the computer to function as a contents presenting system comprising:
an analyzing unit which collects user's conversation to output an analysis result, analyzes a sound volume and a frequency of the user's conversation to judge an atmosphere of an environment where the user is talking, and outputs the atmosphere as an analysis result;
a contents acquiring unit which acquires contents from a contents database based on the analysis result; and
a contents presenting unit which presents the acquired contents to the user, wherein the analyzing unit judges that the atmosphere is a first atmosphere when the sound volume is not smaller than a reference sound volume value and the frequency is not smaller than a reference frequency value and judges that the atmosphere is a second atmosphere when the sound volume is smaller than the reference sound volume value and the frequency is smaller than the reference frequency value, and when the judged atmosphere is the first atmosphere, the contents acquiring unit acquires no content or acquires content which is representative of the first atmosphere.

* * * * *